United States Patent [19]

Villani et al.

[11] 4,265,748
[45] May 5, 1981

[54] LUBRICANT FILTER FOR INTERNAL COMBUSTION ENGINES

[75] Inventors: Franco Villani; Antonina Marciante, both of Turin, Italy

[73] Assignee: Tecnocar S p A, Grugliasco, Italy

[21] Appl. No.: 147,843

[22] Filed: May 8, 1980

[30] Foreign Application Priority Data

Jan. 11, 1980 [IT] Italy .............................. 67035 A/80

[51] Int. Cl.³ ............................................ B01D 35/00
[52] U.S. Cl. .................................... 210/132; 210/149; 210/168; 210/199; 210/206; 210/209; 210/501
[58] Field of Search ............... 210/132, 149, 168, 199, 210/206, 209, 295, 501, 502, 506, 507

[56] References Cited

U.S. PATENT DOCUMENTS

| | | | |
|---|---|---|---|
| 2,529,698 | 11/1950 | Julius | 210/149 |
| 3,749,247 | 7/1973 | Rhode | 210/501 |
| 3,887,468 | 6/1975 | Bray | 210/206 |
| 4,014,794 | 3/1977 | Lewis | 210/206 |
| 4,061,572 | 12/1977 | Cohen | 210/206 |
| 4,075,097 | 2/1978 | Paul | 210/501 |
| 4,144,169 | 3/1979 | Grueschow | 210/501 |

Primary Examiner—Ernest G. Therkorn

[57] ABSTRACT

A lubricant filter for internal combustion engines, comprising a cup-shaped member containing one or preferably two cylindrical crown-shaped filter cartridges. The opening of the cup-shaped member is closed by a cover from which a tubular member extends into the inner space of the filter cartridges. A container containing a mixture of additives for the lubricant is accommodated in the tubular member and has at least one opening closed by a diaphragm made of a material soluble in the hot lubricant. The cover has an eccentric inlet opening for the lubricant to be filtered and an axial outlet opening for the filtered lubricant and may further have a second eccentric outlet opening for part of the filtered lubricant.

14 Claims, 3 Drawing Figures

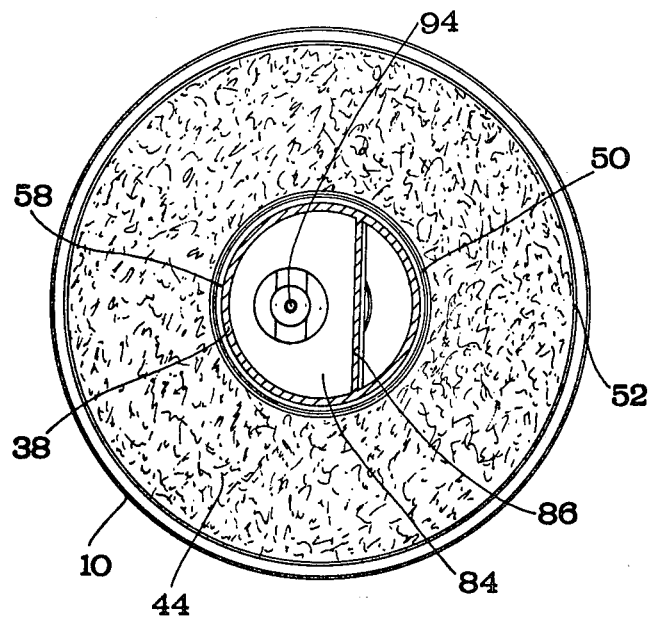
FIG. 2
FIG. 3
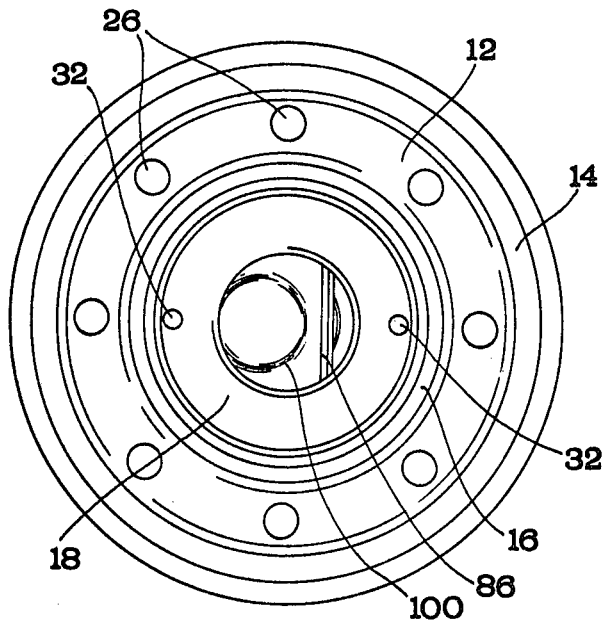

LUBRICANT FILTER FOR INTERNAL COMBUSTION ENGINES

This invention relates to a lubricant filter for internal combustion engines, particularly for motor vehicles, of the type to be screwed on.

As is known, lubricating oils for internal combustion engines, particularly for motor vehicles, are subject to deterioration during use because of the contamination caused by suspended solid particles such as combustion residues, sludge, particles produced by wear and abrasion of the moving engine parts, etc., and also because of exhaustion of the additives which nowadays constitute an essential component of lubricating oils.

Although it would basically be possible to avoid contamination by extensive filtering, for example, by dividing the filtering process into a rougher overall full-flow filtering operation and a finer partial by-pass filtering operation, this solution has hitherto not been generally adopted as it involves the use of double filters with the associated connection fittings, which would increase the overall cost of the filtering installation and complicate the operations necessary for mounting and replacing the filters.

In any case more extensive filtering would not solve the problem of deterioration of the oil by exhaustion of the additives. In fact, as is known, such additives among other things comprise dispersants, which inhibit the aggregation of the fine particles of impurities suspended in the lubricant, as well as anti-wear, anti-corrosion, anti-oxidation and similar agents which cooperate to slow down the process of contamination of the oil circulating through the parts of the engine. The exhaustion of such additives below a predetermined minimum percentage would among other items also permit a more rapid contamination of the engine and this again would necessitate more efficient filters.

Therefore, hitherto one has generally put up with filters with a low level of filtration which were of simple construction, generally of the type to be screwed on, and consequently could be produced at low cost and could also be mounted and dismounted easily and rapidly, but with the drawback that the oil had to be replaced rather frequently.

It is an object of the present invention to provide a lubricant filter of the type to be screwed on, for internal combustion engines, particularly for motor vehicles, which simultaneously ensures a low level of contamination of the oil and a high level of additives. Such a filter will extend the life of the oil beyond the hitherto common period of use (e.g. 10,000 km) and will permit the use of lubricants with a low level of additives, particularly in underdeveloped countries, as well as provide an economical and efficient filtering system for lubricants in heavy engines in which the level of additives must be high over the entire period of use of the oil.

To achieve this object, the invention provides a lubricant filter of the type to be screwed on, for internal combustion engines, particularly for motor vehicles, which comprises a cup-shaped member containing a first cylindrical crown-shaped filter cartridge closed upwardly by a cover having an eccentric inlet opening for the lubricant and an axial outlet opening for the filtered lubricant, characterized in that said cup-shaped member is provided with a container for a mixture of liquid additives, having a wall subjected to the flow of lubricant through the filter and an opening closed by a diaphragm made of a material adapted to dissolve slowly under the action of the hot lubricant.

According to a further feature of the present invention, said first filter cartridge extends substantially from the cover of said cup-shaped member over only a portion of the height thereof and arranged between said first filter cartridge and the bottom of the cup-shaped member is a second cylindrical crown-shaped filter cartridge, a tubular member is secured to said cover and extends axially substantially over the entire length of said cup-shaped member and the gap between the inner surface of said first filter cartridge and the outer surface of said tubular member is closed by a sealing gasket toward the bottom of said cup-shaped member and communicates with the inside of the engine through an outlet opening located eccentrically in said cover between said inlet opening and the centre of said cover.

A preferred embodiment of the invention will now be described by way of example and with reference to the accompanying drawings, in which:

FIG. 2 is a transverse section taken along the line II—II of FIG. 1, and

FIG. 3 is an end view of the dismounted filter as seen from the end of the connection fittings.

Figure 1:
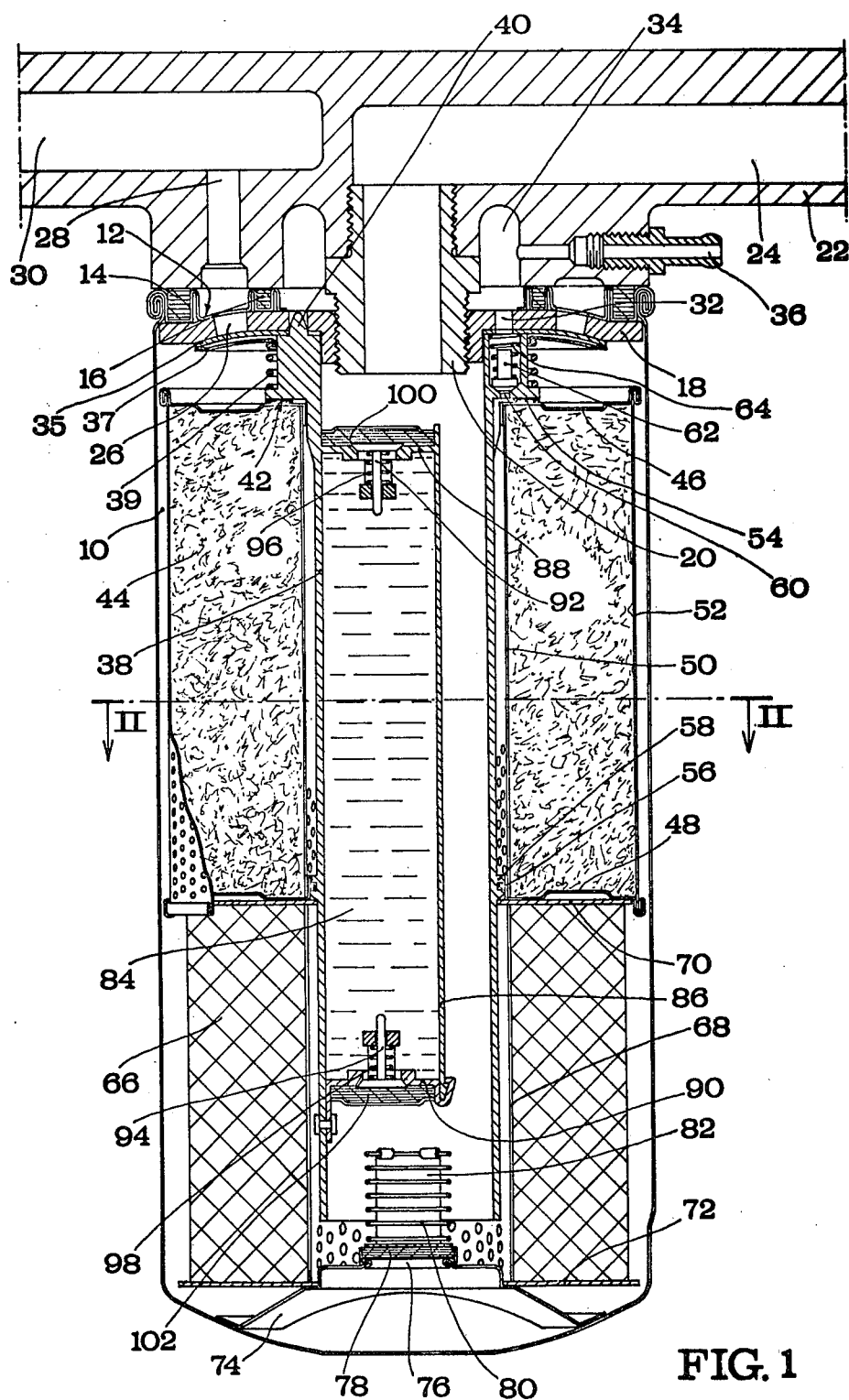
FIG. 1 is an axial section through a filter according to the invention, shown as mounted on an engine.

As shown in FIG. 1, a filter according to the invention is mounted in a substantially cylindrical cup-shaped member 10 of deep drawn sheet metal. A retainer ring 12 of perforated sheet metal is seam folded to the upper open end of the cup-shaped member 10 and provided with concentrical grooves for receiving an outer annular gasket 14 and an anular inner gasket 16. The retainer ring 12 retains an inner cover 18 of thicker sheet metal, provided with a central threaded hole for engagement with a connection fitting 20 on an engine block 22 to establish communication between the inside of the filter and a duct 24 leading to the lubricating circuit of the engine (not shown).

The inner cover 18 is provided with a plurality of holes 26 equidistantly spaced between the gaskets 14 and 16 in a position radially intermediately thereof so that one of these holes will be aligned with a hole 28 in the engine block 22 which communicates with a duct 30 leading in known manner to the lubricant circulating pump (not shown). Finally, at least one hole 32 is provided in the inner cover 18 inwardly of the inner gasket 16 for communication with a duct 34 which through a pipe nipple 36 can be connected to the lubricant circulating pump or tank of the engine (not shown).

A tubular member 38 made preferably of molded synthetic resin is located axially within the cup-shaped member 10 of the filter and secured to the inner cover 18 by a pin 40 engaging in a corresponding recess in the inner cover. The base portion of the tubular member 38, particularly the pin 40, also retains a resilient rubber disk 35 which is normally held in engagement with the inner surface of the cover 18 by a metal ring 37 elastically biassed by a helical spring 39 which yields under the pressure of the oil acting on the holes 26 of the cover 18. Thus, the rubber disk 35 acts as a check valve which prevents evacuation of the filter when the engine is not running if the filter is mounted upside down with respect to the illustration in FIG. 1. The tubular member 38 extends up to a position spaced from the bottom of the cup-shaped member 10 and has a shoulder 42 for supporting a first cylindrical crown-shaped filter cartridge 44 formed of a pair of sheet metal end plates 46, 48 seam folded over tubular walls 50, 52 of perforated sheet metal. The inside of the filter cartridge 44 is filled with filtering material of high filtering power such as compressed cotton wadding capable of removing from the lubricant passing through the filter cartridge particles having a diameter in the order of 0.5 to 1 microns. Although cotton wadding is the preferred material, particularly because of its capability of adsorbing impurities, also other filtering materials of similar filtering power may be used.

The filter cartridge 44 is sealed by a gasket 54 adjacent the shoulder 42 of the tubular member 38 and a second gasket 56 at the opposite end adjacent an annular rib 58 on the tubular member 38. Thus a gap is formed between the tubular member 38 and the inner cylindrical wall 50 of the cartridge 44. This gap is open to the outside only through a hole 60 of restricted diameter, aligned with the hole 32 in the inner cover 18, so that the lubricant filtered by the filter cartridge 44 can be fed directly to the inside of the engine or through a connection nipple 36 to the oil sump of the engine. The hole 60 is closed by a valve 62 biassed in the closed position by a small spring 64. The spring 64 is dimensioned to permit opening of the valve at normal pressure of the lubricant in the filter and to permit closing of the valve at lower pressure as occurs at lower engine speeds when it must be prevented that too much oil is taken away from the main oil flow, as will be explained hereinafter.

Mounted on the distal end of the tubular member 38 adjacent the annular rib 58 is a second filter cartridge 66, for example of the paper type as is common in conventional filters, defined inwardly by a perforated cylindrical wall 68 with end plates 70, 72. The filter cartridge 66 performs a rougher filtering action than the filter cartridge 44 but at a higher rate of flow.

The filter cartridge 66 is retained in position by the pressure exerted by a leaf or disk spring 74 supported on the bottom of the cup-shaped member 10 and having a central opening 76 normally closed by a valve 78 biassed by a helical spring 80 bearing against support members 82 projecting from the disk spring 74. The valve 76 acts as a bleeder valve, as is known in the art, to relieve the cartridge member 66 when it gets clogged up.

Accommodated in an eccentric position in the interior of the tubular member 38 is a container 84 for regenerating additives, defined between the inner surface of the tubular member 38 and a flat wall 86 extending only over a portion of the length of the tubular member 38. The ends of the container 84 are closed by end plates 88, 90 each provided with an opening closed by a valve 92, 94, respectively, biassed in an open position by a spring 96, 98, respectively. However, each of the two valves is normally closed by a disk or diaphragm 100, 102 made of an oil-soluble synthetic resin such as high molecular polyisobutylene, for example, the material known under the trade name Vistanex. However, the diaphragms 100, 102 may also be made of different material, for example, a polymethacrylate or polyolefin, provided that is little soluble in cold oil and easily soluble in hot oil.

The container 84 is filled with a mixture or pack of additives such as dispersing, anti-wear, anti-corrosion and antioxidant agents which during operation of the engine are gradually exhausted by the action of the lubricating oil. The exact doses of the additives depend on various considerations such as the type of the oil used, the type of the engine and the prevailing operating conditions likely to be encountered. Generally the pack of additives to be introduced into the container 84 will be such as to regenerate the oil after the engine has covered about 10,000 kilometers.

Together with the selection of the pack of additives to be introduced into the container 84 also the diaphragms of oil-soluble material 100, 102 will be made of such thickness that, depending upon the type of material used, the diaphragms will completely dissolve in the hot oil after the engine has covered about 10,000 kilometers or some other desired distance.

Under these conditions the described filter will behave as follows:

At the beginning of use, the oil coming from the circulating pump leaves the engine block through the duct 28 and enters the filter through the hole 26 in the sheet metal retainer ring 12 on the inner cover 18. The oil will then fill the interior of the cup-shaped member 10 outwardly of the filter cartridges 44 and 66 and under the impact imparted to the oil by the circulating pump the oil will penetrate into and through the filter cartridges and will be filtered thereby. The oil passing through the filter cartridge 44 is all fed to the duct 34 and from there to the connection nipple 36 to be discharged directly into the interior of the engine or through an appropriate inner duct system into the oil sump, an oil container or an oil exchanger.

The oil flowing through the filter cartridge 66, which cannot combine with the oil flow through the filter cartridge 44 because there is the gasket 56, consequently has to flow into the interior of the tubular member 38 and from there into the duct 24 leading to the lubricating circuit, particularly the main bearings etc, through the connection fitting 20.

The different structure of the filter cartridges 44 and 66 is such that the resistance to oil flow in the filter cartridge 44 is much greater than the resistance encountered in the filter cartridge 66. This difference is designed to conduct the major portion of the oil entering the filter, through the filter cartridge 66, whereas only a small percentage of the oil, for example, a thirtieth of the overall oil flow, is filtered by the filter cartridge 44 at each passage of the oil. Therefore, on the average thirty complete cycles of circulation of the oil would be needed before all the oil is filtered by the filter cartridge 44. Therefore, the provision of the two filter cartridges permits to effect a constant general base filtration of the rougher impurities present in the oil and at the same time to filter the smaller particles of the size of some microns by the filter cartridge 44.

As the oil flowing through the filter cartridge 66 passes through the inner opening in the tubular member 38, it continuously acts on the diaphragms 100 and 102 of oil-soluble polymer material and gradually dissolves them. However, as the material of the diaphragms 100, 102 is little soluble in cold oil and much more easily soluble in hot oil, the diaphragms are dissolved substantially only during the operation of the engine and therefore the overall amount of dissolved material is approximately proportional to the number of revolutions of the engine or to the number of miles covered by the motor vehicle. When a predetermined mileage has been reached, for example, about 10,000 kilometers, the diaphragms 100, 102 will have been completely eroded or dissolved, so that the valves 92 and 94 can open under the action of the springs 96 and 98, respectively. Thus, the pack of additives in the container 84 can discharge into the oil flowing through the filter to regenerate the oil which is also kept at a high degree of purity by the double filtering system.

Although a preferred embodiment of the invention has been described it is to be understood that numerous changes and modifications may be made therein without departing from the general inventive idea. More particularly, the technical solution illustrated above for automatically regenerating exhausted lubricating oils, although it is very useful when used in combination with the double filtering system, also affords considerable advantages when used in association with more common filters having only one filter cartridge and therefore it is to be understood that the scope of the invention also extends to this type of filters when they are provided with the container of additives proposed according to the invention.

According to a further possible modification, the ends of the container 84 could be closed only by the diaphragms 100, 102 without the valves 92, 94. These valves only serve to isolate the material of the diaphragms 100, 102 from the additives in the container 84 during storage of the filter to prevent the diaphragms from being dissolved by the action of the additives, which would result in a considerable deterioration of the filter before it is used, in case of prolonged storage. This precaution is not necessary where the filter is not likely to be stored for a prolonged period.

Also the provision of the pair of diaphragms at the opposed ends of the container is not an essential feature of the present invention. In fact, the same purpose could also be achieved by a single opening closed by only one diaphragm.

Finally, all mechanical and structural features of the filter, particularly the type of filter cartridges used and the manner in which the various required connections and ducts are made, are subject to variation according to the intended application and preference of the manufacturer.

The scope of the invention is defined only by the appended claims.

What we claim is:

1. A lubricant filter of the type to be screwed on, for internal combustion engines, particularly for motor vehicles, comprising a cup-shaped member containing a first cylindrical crown-shaped filter cartridge closed upwardly by a cover having an eccentric inlet opening for the lubricant and an axial outlet opening for the filtered lubricant, said cup-shaped member being provided with a container for a mixture of liquid additives, having a wall subjected to the flow of lubricant through the filter and an opening closed by a diaphragm made of a material adapted to dissolve slowly under the action of the hot lubricant, said valve being biassed in the open position by a spring mounted in said opening and the diaphragm arranged to prevent the opening of the valve.

2. A lubricant filter as claimed in claim 1, wherein a tubular member extends axially through said cup-shaped member inwardly of said first filter cartridge to feed at least part of the lubricant to said outlet opening and said container is located within said tubular member.

3. A lubricant filter as claimed in claim 2, wherein said container is defined by a portion of the wall of said tubular member, a longitudinal flat wall and a pair of end plates and said opening is located in one of said end plates.

4. A lubricant filter as claimed in claim 3, wherein one of said openings is located in each of said end plates.

5. A lubricant filter as claimed in claim 1, wherein said material which is soluble in the hot lubricant is an oil-soluble polymer material.

6. A lubricant filter as claimed in claim 1, wherein said material which is soluble in the hot lubricant is an oil-soluble high molecular polyisobutylene.

7. A lubricant filter as claimed in claim 1, wherein said material which is soluble in the hot lubricant is an oil-soluble polyolefin.

8. A lubricant filter as claimed in claim 1, wherein said material which is soluble in the hot lubricant is an oil-soluble polymethacrylate.

9. A lubricant filter as claimed in claim 1, wherein said first filter cartridge extends substantially from the cover of said cup-shaped member over only a portion of the height thereof and arranged between said first filter cartridge and the bottom of said cup-shaped member is a second cylindrical crown-shaped filter cartridge, a tubular member is secured to said cover and extends axially substantially over the entire length of said cup-shaped member and the gap between the inner surface of said first filter cartridge and the outer surface of said tubular member is closed by a sealing gasket toward the bottom of said cup-shaped member and communicates with the inside of the engine through an outlet opening located eccentrically in said cover between said inlet opening and the centre of said cover.

10. A lubricant filter as claimed in claim 9, wherein said second filter cartridge is arranged to exert a rougher and more rapid filtering action than said first filter cartridge.

11. A lubricant filter as claimed in claim 9, wherein said second filter cartridge is arranged to exert on the flow of lubricant less resistance than said first filter cartridge.

12. A lubricant filter as claimed in claim 9, wherein said outlet opening located eccentrically in said cover has a restricted diameter.

13. A lubricant filter as claimed in claim 9, wherein said outlet opening located eccentrically in said cover is provided with a valve controlled by a spring acting against the flow of the lubricant and dimensioned to permit opening of the valve only when a predetermined pressure is exceeded.

14. A lubricant filter as claimed in claim 1, wherein said cover is provided with a pair of coplanar toroidal gaskets arranged concentrically to the axis of said cup-shaped member, one of said gaskets being located inwardly and the other outwardly of said inlet opening, and said opening closed by said diaphragm is located radially inwardly of said inwardly located gasket and said axial outlet opening is provided with a screw thread.

* * * * *